March 3, 1964   D. G. SPRIGINGS   3,123,191
CURRENT COLLECTOR MECHANISM
Filed April 20, 1961   4 Sheets-Sheet 1

INVENTOR.
DONALD G. SPRIGINGS
BY
ATTORNEY.

March 3, 1964
D. G. SPRIGINGS
3,123,191
CURRENT COLLECTOR MECHANISM
Filed April 20, 1961
4 Sheets-Sheet 2
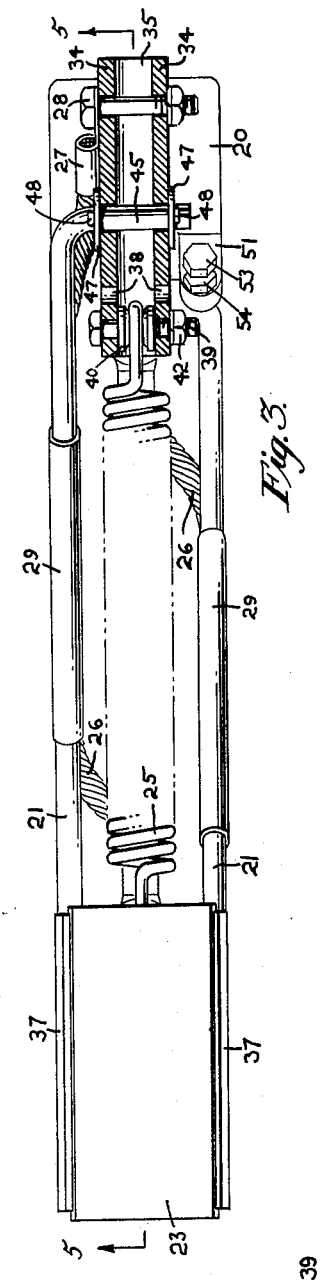
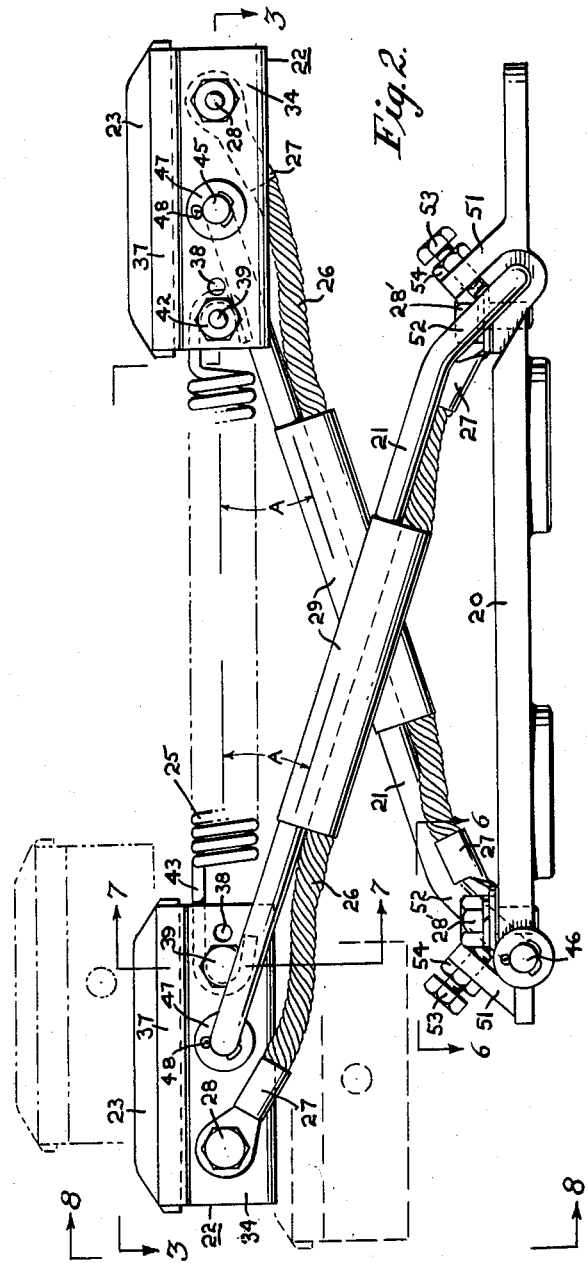
INVENTOR.
DONALD G. SPRIGINGS
BY
ATTORNEY.

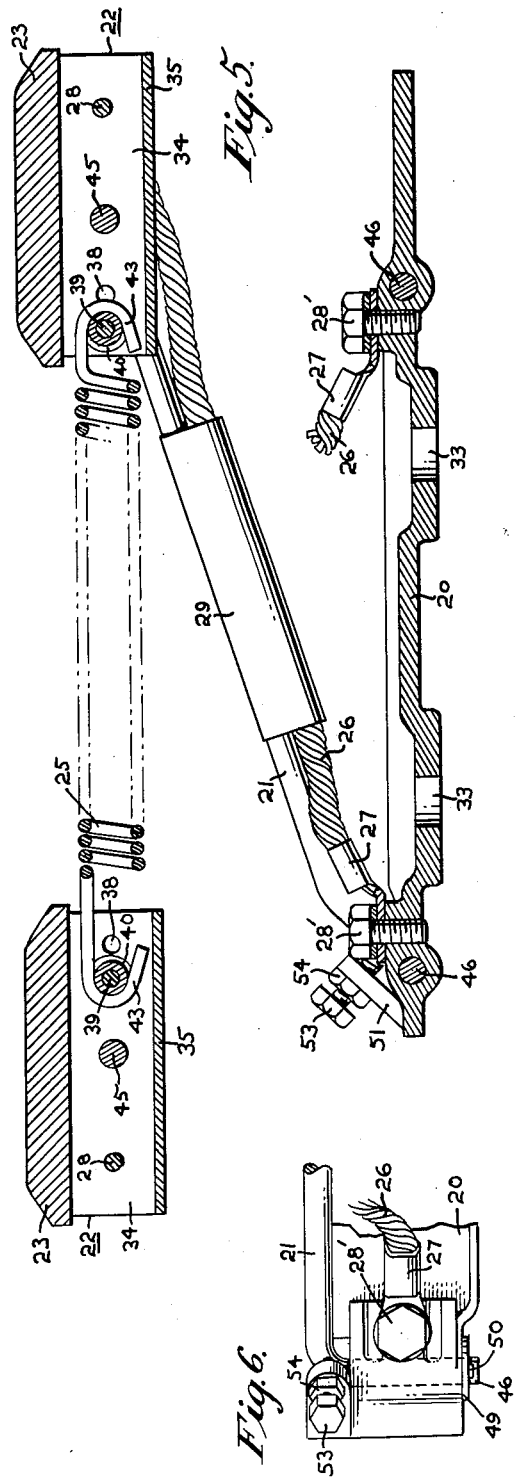

March 3, 1964      D. G. SPRIGINGS      3,123,191
CURRENT COLLECTOR MECHANISM
Filed April 20, 1961      4 Sheets-Sheet 4

INVENTOR.
DONALD G. SPRIGINGS
BY
ATTORNEY.

United States Patent Office 3,123,191
Patented Mar. 3, 1964

3,123,191
CURRENT COLLECTOR MECHANISM
Donald G. Sprigings, Lynchburg, Va., assignor to H. K. Porter Company, Inc., Philadelphia, Pa., a corporation of Delaware
Filed Apr. 20, 1961, Ser. No. 104,289
15 Claims. (Cl. 191—58)

This invention relates generally to current collector arms mountable on movable utilities for the purpose of transferring electric current from a conductor rail system to the utility for operation thereof. More particularly, this invention relates to a particular type of current collector arm which may be designated as a cross arm collector. As is implied by the name, the collector device includes a pair of separately pivoted arms extending upward from a mounting base in crossed fashion to upper terminating points upon which are mounted a pair of pivoted collector shoes intercoupled by a tensioning spring. This structure provides for independent shiftability of each collector shoe toward and away from the mounting base and independent pivotal motion of each collector shoe about the upper terminus of its associated mounting arm. The tension spring intercoupling the collector shoes provides the bias which engages the shoes with the associated conductor rail system and provides a follower action which establishes a proper lead-in angle for the trailing one of the contact shoes in conductor rail systems provided with run-on and run-off conductors, as for example where the conductor rail system includes a break therein such as at a railway crossing or a roadway.

A primary object of this invention is to provide a novel current collector device which includes a pair of spaced apart collector shoes interconnected by a tensioning spring and having each shoe so mounted to a separate pivoted supporting arm that each shoe is independently shiftable toward and away from the associated mounting base while maintaining a fairly constant contact pressure between the collector shoe contact block and its associated conductor rail within a relatively wide range of shifting movement;

Another object of this invention is to provide a novel current collector device as aforesaid wherein the collector shoes are each mounted to one of a pair of crossed shoe supporting arms which are pivotally connected to a supporting base member with each arm free to move independently of the other arm;

Yet another object of this invention is to provide a novel current collector device incorporating a pair of crossed independently pivoted collector-shoe supporting arms and including a spring tensioning device which simultaneously biases both contact collector shoes and their associated arms toward engagement with a conductor rail system, but which allows independent action of each contact collector shoe and arm relative to the other contact shoe and arm while maintaining the bias on both arms and shoes;

Still another object of this invention is to provide a novel current collector device as aforesaid wherein each contact collector shoe includes means for quickly and easily releasing therefrom the conductor rail system engaging contact block, thereby effecting a simple and rapid replacement of such contact blocks when sufficiently worn;

A further object of this invention is to provide a novel current collector device wherein the pivoted contact collector shoes are so supported by their respective arms and intercoupled by the spring tensioning device that a follower action is provided whereby the trailing one of the pair of contact collector shoes assumes an optimum angle for engagement with the curved ends of a run-off type conductor rail system as it is lead thereinto after contact is established between the conductor rail system and the leading contact shoe.

The foregoing and other objects of this invention will become apparent from a reading of the following specification in conjunction with an examination of the appended drawings, wherein:

FIGURE 2 is an enlarged side elevation of the current collector device illustrated in perspective in FIGURE 1 with alternate elevated positions of one of the contact shoes being illustrated by a phantom line showing;

FIGURE 3 is a plan view, partly in section, of the current collector device as would be seen when viewed along the lines 3—3 of FIGURE 2;

FIGURE 4 is a bottom plan view looking upward at the current collector device of FIGURES 1 and 2;

FIGURE 5 is a vertical sectional view through the current collector device as would be seen when viewed along the lines 5—5 of FIGURE 3;

FIGURE 6 is an enlarged fragmented detail view of the pivotal connection of one of the shoe supporting arms of the current collector device as would be seen when viewed along the line 6—6 of FIGURE 2;

FIGURE 7 is a fragmentary vertical sectional view through one of the current collector shoes as would be viewed along the line 7—7 of FIGURE 2 showing certain details of the tension spring anchoring structure;

In the several figures, like elements are denoted by like reference characters.

Figure 1:
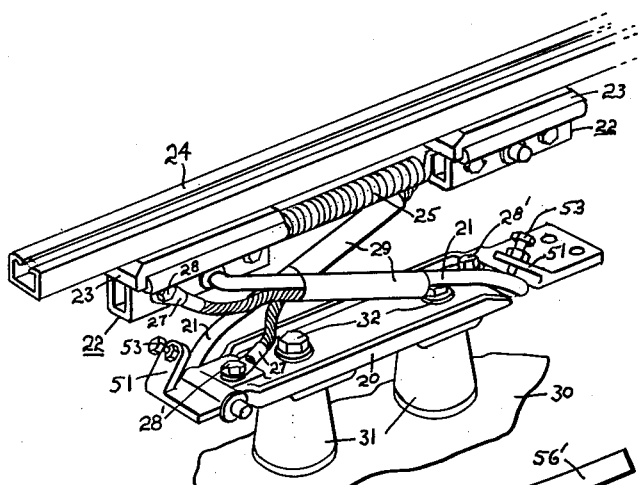
FIGURE 1 is a perspective view of the current collector device according to the invention, illustrated with the contact blocks thereof in physical engagement with one rail of a conductor rail system.
Figure 10:
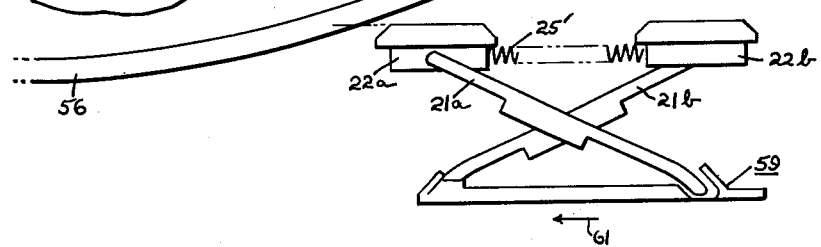
FIGURES 10, 11 and 12 are diagrammatic showings illustrating progressive engagement of the shoes of the current collector device with the end of a run-off type of rail system and shows the follower action of the trailing shoes, as previously mentioned.

Considering first FIGURES 1 and 2, it is observed that the current collector device includes a cast, generally elongated rectangular base member 20, a pair of crossed arms 21 pivotally secured to the base 20 and extending upward to points of pivotal connection with the collector shoes 22, each collector shoe carrying a contact block 23 biased vertically upward into engagement with the underside of a C-bar conductor rail 24 by means of the coil tension spring 25 extending between and secured to the facing ends of the collector shoes 22. Each collector shoe 22 is positively electrically connected to the base member 20 by means of the flexible braided conductors 26, terminal lugs 27 and bolts 28 and 28'. The flexible conductors 26 are secured to the arms 21 as by means of tapes or sleeves 29, and the base member 20 is secured to its utility 30 by means of the insulating stand-offs 31 which latter are secured to the base member by bolting assemblies 32, the bolts of which are projected downward through holes 33 in the base member 20.

Figure 8:
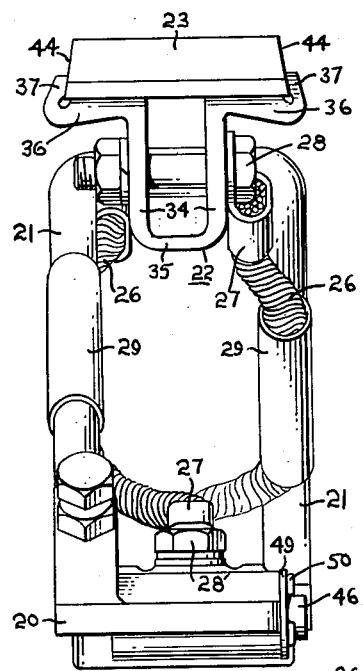
FIGURE 8 is an enlarged left-hand end elevation of the current collector device as can be seen when viewed along the lines 8—8 of FIGURE 2.

As is most clearly seen in FIGURE 8, each collector shoe 22 comprises a central U-shaped channel section having side walls 34 and a bridging bottom wall 35, the channel side walls 34 having lateral flanges 36 extending horizontally outward from the tops thereof which terminate with upwardly inturned contact block clamping edges 37. As best seen in FIGURES 2, 3 and 5, the collector shoe central channel section sidewalls 34 are each transversely drilled proximate their facing ends with two sets of aligned holes 38 which provide the anchor points for the coil spring end anchor assemblies best seen in the showings of FIGURES 3 and 7. Each of the coil spring anchor assemblies includes a bolt 39 projected horizontally through the holes 38 and having disposed revolubly upon the shank thereof and between the collector shoe channel sidewalls 34 a small pulley wheel 40 made of electrical insulation material to prevent passage of current through the spring 25, the threaded end of the bolt 39 being secured by means of a washer 41 and nut 42. The coil spring end loops 43 are suitably disposed about the pulley wheels 40 and thereby firmly anchored. The two sets of holes 38 provide a tensioning adjustment means, minimum tension of the coil spring 25 being obtained when the holes 38 closest to the facing ends of the collector shoes 22 are utilized as the anchoring points for the coil spring end anchoring assemblies, and maximum spring tension being obtained when the remaining set of holes 38 are utilized to cause increased tensioning of the spring 25. As illustrated in FIGURE 5, the spring 25 is anchored through the end holes 38 of the right hand shoe 22 and to the left-hand-most holes 38 of the left hand collector shoe 22 to thereby provide an intermediate tension for the coil spring 25. Of course, additional hole positions could readily be provided if desired for other combinations of spring tension, or a stronger or weaker spring could be employed.

Figure 14:
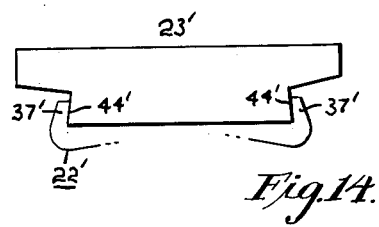
FIGURE 14 is an end elevational view of a portion of one of the contact collector shoes illustrating as clamped therewithin an alternate type of contact block.

The bolting structures including the bolts 28 and 39 projected through the collector shoes channel section sidewalls 34 serve an additional function over and above those which have already been described, namely, the functions of anchoring the flexible conductors 26 and the coil spring anchor assemblies respectively. The additional function provided by these bolting assemblies is that of clamping the contact blocks 23 firmly between the block clamping edges 37 of the collector shoes 22. By loosening the bolting assembly 28 and 39, the lateral pressure exerted by the block clamping edges 37 of the collector shoes 22 is substantially released, and the contact block 23 may be readily slid endwise out of engagement with the collector shoes 22 and may be replaced by a new contact block, the bolting assemblies 28 and 39 being thereafter retightened to firmly clamp the new block to the collector shoe. As is seen in the showings of FIGURES 8 and 14, the side surfaces 44 of the contact block 23 and 44' of the alternate type of contact block 23' are tapered outward from top to bottom so as to be overlapped by the collector shoe clamping edges 37.

Figure 9:
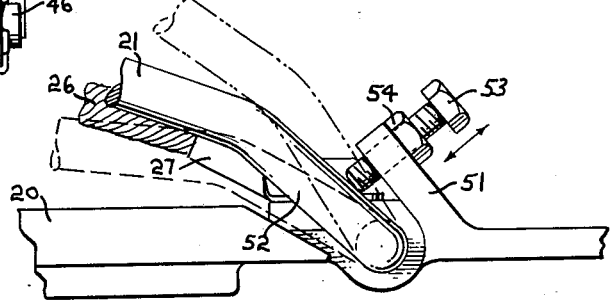
FIGURE 9 is an enlarged side-elevation of the lower right hand section of the device as seen in FIGURE 2 illustrating adjustable stop means for limiting the vertical motion of the shoe carrying arms.

As best seen in FIGURES 2, 4, 5 and 6, each of the arms 21 is generally of U-shape having an upper laterally turned arm portion 45 and a lower laterally turned arm portion 46. The upper arm portion 45 is projected laterally through a pair of aligned holes in the collector shoe central channel section sidewalls and is secured thereto by means of a pair of outside washers 47 and cotter pins 48 projected through holes drilled transversely through the upper arm portions 45. Similarly, the lower laterally turned arm portions 46 are projected through lateral bores formed in the base member 20 at opposite ends thereof and secured by washers 49 and cotter pins 50. The laterally turned upper arm portions 45 and lower arms portions 46 constitute free pivots so that it will be seen that the coil spring 25 secured to the collector shoes 22 always tends to urge the collector shoes upward away from the base member 20 by exerting an inward pull on the collector shoes 22 and causing the arms 21 to pivot upward about their lower pivot connections to the base member 20. In the absence of any restraining means, a particularly chosen coil spring 25 could pull the pair of collector shoes 22 toward one another until the tension in the coil spring reduces to substantially zero, which would produce an undesirable and uncontrollable slack condition of the collector shoes 22. This is avoided by means of the motion limiting stops comprising part of the base member 20 structure. These stops are best seen in the showings of FIGURES 1, 2 and 9, to which reference should be now made.

The stop devices include a pair of ears 51 formed integrally with the base member 20 and projecting upward from the surface of the latter in overlying relation to the offset short sections 52 which join the straight line major part of the arms 21 to the laterally turned lower arm portions 46 thereof. Each of the ears 51 is bored and threaded so as to threadedly receive an adjustable stop bolt 53. Threaded onto the stop bolt 53 before threading the same through the associated ear 51 is a locking nut 54 by means of which an adjusted position of the stop bolt 53 may be fixed and locked. As illustrated by the phantom line showings of FIGURES 2 and 9, the collector shoes 22 may be set up to shift within relatively wide limits toward and away from the base member 20, the maximum possible swing being of course achieved when the stop bolts 53 are retracted so that the ends thereof which normally bear against the off-set short sections 52 of the collector arms 21 are substantially flush with the undersurface of the ears 51. However, as shown in FIGURES 2 and 9 the motion of the collector shoes 22 away from the base member 20 is limited to the illustrated solid line position by virtue of the fact that the stop bolts 53 have been adjusted downward to prevent the off-set short sections 52 of the collector arms 21 from pivoting above the illustrated position.

Figure 11:
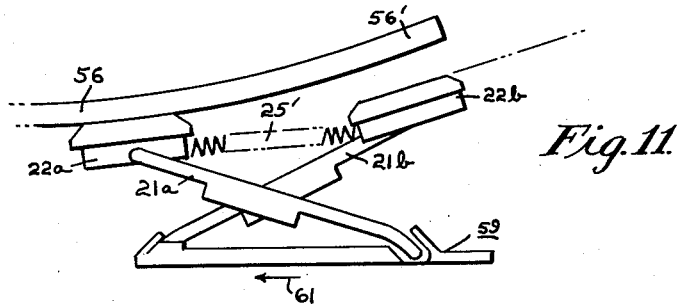
Figure 12:
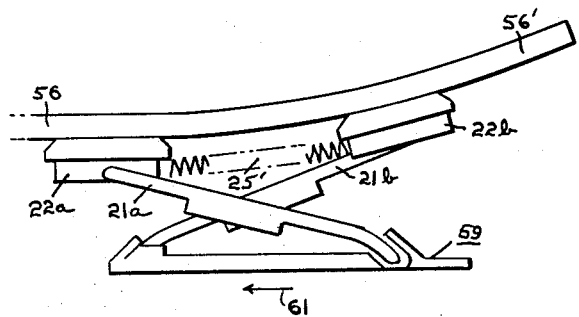
Figure 13:
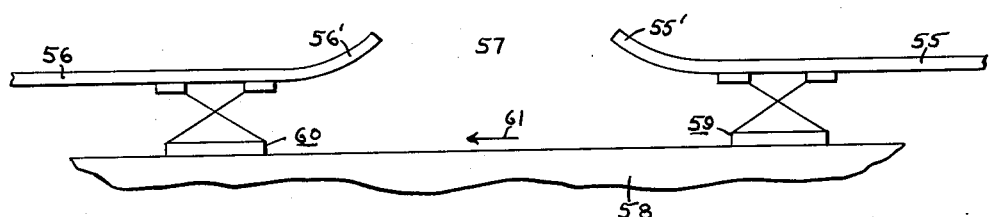
FIGURE 13 is a diagrammatic representation of the manner of utilizing a pair of such current collector devices with a single utility when that utility draws power from a conductor rail system having run-on and run-off breaks therein.

Turning now to a consideration of FIGURES 10 through 13, there will be seen in FIGURE 13 a diagrammatic representation of a conductor rail system having conductors 55 and 56 physically separated from one another by an intervening gap or break region 57 such as would occur at a railroad crossing or a bisecting roadway. Each of the conductors has a radiused end section 55' and 56'. It follows naturally, that a utility 58 which is energized from the conductors 55 and 56 must be provided with a pair of current collector devices such as 59 and 60 so positioned that one of the collector devices will remain in electrical contact with one of the conductors until the other collector device has passed the gap 57 and established electrical contact with the other one of the conductors. Assuming for the moment that the utility 58 is moving in a left hand direction as indicated by the arrow 61, and further assuming that, for example, the right hand current collector device 59 has lost contact with the conductor rail 55 and is positioned in the break region 57, attention should be now directed to FIGURES 10, 11 and 12 which illustrate the operation of the current collector devices during a run-on condition, that is, as the current collector device 59 makes contact with the left hand conductor rail 56.

As the current collector device 59 moves leftward in the break region 57, it is observed that the collector arms 21a and 21b are symmetrically oriented in cross fashion and the collector shoes 22a and 22b carried thereby are horizontally disposed due to the action of the tension coil spring 25'. The upward vertical displacement of the collector shoes 22a and 22b is of course determined by the stop mechanism associated with the lower regions of the collector arms 21a and 21b as previously described. As the current collector device 59 continues its leftward directed motion, the left hand end of the contact block carried by collector shoes 22a engages the upward radiused end 56' of the conductor rail 56, and, as is seen in FIGURE 11, engagement of the collector shoes contact block causes the collector shoe 22a to pivot about the upper end of the collector arm 21a and swing into flatwise contact with the undersurface of the conductor 56. As the contact is established between the contact block of the collector shoe 22a and the conductor rail 56 it is observed that the curvature of the radiused portion 56' of the conductor rail 56 causes the collector shoe 22a to be moved downward toward its base member and hence causes the collector arm 21a to pivot downward about its pivot connection with the current collector device base member and carry downward the left hand end of the coil spring 21'. This in turn causes the left hand end of the collector shoe 22b to pivot downward about its pivot connection with the upper end of the collector arm 21b, while the collector arm 21b itself remains motionless. The upper surface of the contact block carried by the collector shoe 22b therefore assumes an inclination substantially parallel to the undersurface of the radiused portion 56' of the conductor rail 56, this orientation being maintained until contact is established between the contact block carried by the collector shoe 22b and the radiused portion of the conductor rail 56, as illustrated in the showing of FIGURE 12. The contact block of the collector shoe 22b is thus smoothly engaged with the conductor rail, and mechanical shock is minimized. The disengagement action of the current collector devices from the conductor rail system will be apparent from a consideration of FIGURES 10, 11 and 12 in reverse order by assuming that the current collector device 59 is moving in the direction opposite to that shown, that is toward the right instead of toward the left.

Returning now to the showing of FIGURE 2, it will be observed that an acute angle A is defined by the intersection of the longitudinal axis of each of the collector arms 21 with the longitudinal axis of the coil spring 25, these axes intersecting at the pivotal connection of each arm 21 with its associated collector shoe 22. Further, it will be noted that deflection of both collector shoes 22 upward from the solid line position to the upper phantom line position causes a simultaneous decrease in the extension of the coil spring 25 and increase in the magnitude of the angles A, which of course results in reduced spring tension and an increase in the magnitude of the sine function of the angles A. Since it can be shown mathematically that the contact force between the collector shoe contact block and the associated conductor rail decreases with decreasing spring tension and increases with increasing values of the angle A sine function, it will be now recognized that an offsetting action occurs between these two parameters which tends to maintain the net contact force fairly constant. A similar action takes place for deflections of the collector shoes 22 downward from the solid line center positions, the parametric changes in this case being reversed. That is, the increase in spring tension is offset by a decrease in the magnitude of the angle A sine function.

Figure 15:
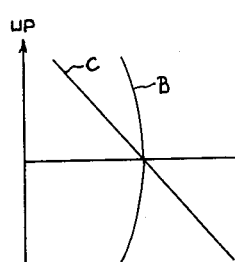
FIGURE 15 is a diagram illustrating the improved contact force conditions obtainable between the collector shoe contact block and its associated conductor rail by utilizing the current collector device according to the invention.

By proper choice of the angle A at center position and the length of the arms 21, it is possible to greatly reduce the variation in contact force which occurs with conventional current collector devices throughout the normal range of collector shoe deflection. A graphic representation of this result is shown in the comparison of FIGURE 15 wherein the straight line C depicts the relatively wide variation in contact force occurring with conventional devices as a function of deflection from center position, and the curve B denotes the general form and more limited variation of contact force obtainable with the construction according to the instant invention.

Having now described my invention in connection with a particularly illustrated embodiment thereof, it will be realized that variations and modifications thereof may now occur to those persons normally skilled in the art without departing from the essential spirit or scope of my invention, and accordingly it is intended to claim the same broadly as well as specifically as indicated by the appended claims.

What is claimed as new and useful is:

1. A current collector device for transferring electrical current from a conductor rail system to an electrically energizable work utility, comprising in combination, a mounting base adapted for physical securement to the work utility for travelling motion therewith, a pair of spaced apart current collector shoes each carrying a separate contact block and oriented for disposition lengthwise of the conductor rail system from which the work utility is energized with the contact blocks adapted for simultaneous sliding surface contact with the same rail of the conductor rail system, a pair of independent arms pivotally coupled to spaced apart points of said mounting base for rotation about parallel axes and extending away from the base in crosswise orientation to one another, each of said arms being pivotally coupled at its outer end to a different one of said pair of collector shoes so that said shoes are pivotable on parallel axes oriented transversely to the lengthwise extent of the conductor rail with which they are associated and which parallel axes are parallel to the pivotal axes of said arms relative to said mounting base, and resilient biasing means extending between and coupled to the proximate ends of said pair of shoes, whereby said shoes are biased toward one another and the outer ends of said arms tend to pivot outward away from said mounting base.

2. The current collector device according to claim 1 further including stop means associated with said mounting base effective to limit the outward pivotal motion of the outer ends of said arms.

3. The current collector device according to claim 1 further including rigid means projecting from said mounting base toward said collector shoes in partial overlying relationship to said arms effective to prevent more than a predetermined pivotal motion of the latter away from the mounting base.

4. The current collector device according to claim 1 wherein said collector shoes each comprise a central U-shaped channel section having spaced-apart sidewalls and a bridging bottom wall, said sidewalls each having a lateral flange turned outward from the top thereof each of which terminates in an upwardly inturned lip, said lateral flanges conjointly providing a seating surface upon which is seated a contact block having opposite side surfaces tapering toward one another as they recede from the bottom surface of the contact block, said collector shoe inturned flange lips overlying the said tapering side surfaces of said contact block and being pressed firmly toward one another to clamp the block therebetween by pressure exerting means extending between the spaced-apart sidewalls of the collector shoe central U-shaped channel section.

5. The current collector device according to claim 1 wherein said collector shoes each comprise a central U-shaped channel section having spaced-apart sidewalls and a bridging bottom wall, said sidewalls each having a lateral flange turned outward from the top thereof each of which terminates in an upwardly inturned lip, said lateral flanges conjointly providing a seating surface upon which is seated a contact block havin gopposite side surfaces tapering toward one another as they recede from the bottom surface of the contact block, said collector shoe inturned flange lips overlying the said tapering side surfaces of said contact block and being pressed firmly toward one another to clamp the block therebetween by pressure exerting means extending between the spaced-apart sidewalls of the collector shoe central U-shaped channel section, said pressure exerting means comprising the anchoring devices which couple said resilient biasing means to said collector shoes.

6. The current collector device according to claim 1 wherein said resilient biasing means comprises an extensible and contractable tensioning device which is initially tensioned to a predetermined condition when said collector shoes are normally positionally engaged with their associated conductor rail, the tension decreasing from the said predetermined condition when the collector shoes move outward relative to the mounting base and the tension increasing above the said predetermined condition when the collector shoes move inward toward the mounting base, said inward and outward movements of said collector shoes relative to said mounting base occurring due to variations in the spacing between the mounting base and conductor rail system at different points along the length of the conductor rail system, and further wherein the line of action of said tensioning device defines an acute angle with the longitudinal axis of each collector arm to thereby induce on each collector arm a force component proportional to the tension of the tensioning device and to the sine function of the acute angle effective to bias the collector shoes against the conductor rail, said defined acute angle and the predetermined condition of said tensioning device being so initially chosen that changes in tension and changes in the acute angle occurring simultaneously due to the aforesaid inward and outward movements of said collector shoes relative to said mounting base substantially offset one another and maintain substantially constant the induced force component acting on each collector arm effective to bias the collector shoes against the conductor rail.

7. The current collector device according to claim 4 wherein said resilient biasing means comprises a tension coil spring the opposite ends of which extend respectively into the central U-shaped channel sections of different ones of said pair of collector shoes and are secured therewithin.

8. The current collector device according to claim 6 wherein said tensioning device is a coil spring.

9. A current collector shoe comprising a central U-shaped channel section having spaced apart sidewalls including a pair of aligned apertures therethrough and a bridging bottom wall, said sidewalls each having a lateral flange turned outward from the top thereof each of which terminates in an upwardly inturned lip, said lateral flanges conjointly providing a seating surface upon which is seated a contact block having opposite side surfaces tapering toward one another as they recede from the bottom surface of the contact block toward the top surface thereof, said collector shoe inturned flange lips overlying the said tapering side surfaces of said contact block and being pressed firmly toward one another to clamp the block therebetween by pressure exerting means extending between the spaced-apart sidewalls of the collector shoe central U-shaped channel section, a collector shoe supporting arm having a main arm portion and opposite end portions turned laterally away from the main arm portion, one of said laterally turned arm end portions being projected through both of the aligned apertures in said shoe sidewalls and secured against withdrawal therefrom so that said shoe is freely pivotable on said arm end portion secured thereto, and a mounting base for said shoe supporting arm having a bore therethrough within which the remaining one of said laterally turned arm end portions is secured for rotation so that said arm may pivot about said base within limits.

10. The apparatus according to claim 9 wherein said mounting base further includes stop means engageable with the shoe supporting arm effective to prevent more than a predetermined amount of pivotal movement of said arm relative to said mounting base in at least one direction of arm rotation.

11. The apparatus according to claim 9 wherein said laterally turned arm end portions are parallel to one another so that the pivotal axis of said collector shoe relative to its supporting arm and the pivotal axis of said arm relative to its supporting mounting base are parallel to one another.

12. In a current collector device the combination comprising, a current collector shoe including means for mounting the same to a shoe supporting arm, a collector shoe supporting arm having a main arm portion and opposite end portions turned laterally away from the main arm portion, one of said laterally turned arm end portions being secured to said shoe by said shoe mounting means for free pivotal motion of said shoe about said arm end portion secured thereto, and a mounting base for said shoe supporting arm having a bore therethrough within which the remaining one of said laterally turned arm end portions is secured for rotation so that said arm may pivot about said base within limits.

13. The apparatus according to claim 12 wherein said mounting base further includes stop means engageable with the shoe supporting arm effective to prevent more than a predetermined amount of pivotal movement of said arm relative to said mounting base in at least one direction of arm rotation.

14. The apparatus according to claim 12 wherein said laterally turned arm end portions are parallel to one another so that the pivotal axis of said collector shoe relative to its supporting arm and the pivotal axis of said arm relative to its supporting mounting base are parallel to one another.

15. The device according to claim 12 further including resilient biasing means operative to bias said arm for pivotal motion relative to said mounting base in a direction which moves said collector shoe away from said mounting base.

References Cited in the file of this patent

UNITED STATES PATENTS

| | | |
|---|---|---|
| 884,630 | Bauer | Apr. 14, 1908 |
| 1,934,510 | Schaake | Nov. 7, 1933 |
| 2,508,176 | Langer | May 16, 1950 |

FOREIGN PATENTS

| | | |
|---|---|---|
| 556,249 | France | Apr. 10, 1923 |
| 935,715 | France | Feb. 9, 1948 |
| 355,567 | Great Britain | Aug. 27, 1931 |
| 636,570 | Great Britain | May 3, 1950 |
| 85,407 | Sweden | Feb. 4, 1936 |
| 643,354 | Germany | Apr. 7, 1937 |
| 463,804 | Italy | June 5, 1951 |
| 590,858 | Canada | Jan. 19, 1960 |